United States Patent [19]
Canik et al.

[11] Patent Number: 5,287,528
[45] Date of Patent: Feb. 15, 1994

[54] IEEE 488 INTERFACE FOR MESSAGE HANDLING METHOD

[75] Inventors: Robert Canik, Cedar Park; Brian K. Odom; William C. Nowlin, Jr., both of Austin, all of Tex.

[73] Assignee: National Instruments Corporation, Austin, Tex.

[21] Appl. No.: 548,293

[22] Filed: Jul. 3, 1990

[51] Int. Cl.$^5$ .............................................. G06F 13/42
[52] U.S. Cl. ............................. 395/800; 364/940.81; 364/DIG. 2
[58] Field of Search ............... 395/200, 275, 325, 425, 395/800

[56] References Cited

U.S. PATENT DOCUMENTS

| | | | |
|---|---|---|---|
| 4,319,338 | 3/1983 | Grudowski et al. | 395/725 |
| 4,402,055 | 8/1983 | Lloyd et al. | 364/579 |
| 4,523,310 | 6/1985 | Brown et al. | 370/112 |
| 4,534,011 | 8/1985 | Andrews et al. | 395/250 |
| 4,680,788 | 7/1987 | Cordiero et al. | 379/93 |
| 4,727,370 | 2/1988 | Shih | 340/825.1 |
| 4,982,325 | 1/1991 | Tignor et al. | 395/325 |

OTHER PUBLICATIONS

"IEC Interface bus (IEEE-488) simplified"; J. Summers; 8029 Electronic Engineering; vol. 51, (1979), Dec., N 632; pp. 45-55; London, England.
"What are RS-232C and IEEE 488?"; Steve Leibson; 159 Instruments & Control; Systems; vol. 53, (1980), Jan.; No. 1; pp. 47-53; Radnor, Pa., USA.
"GPIB combiner"; David J. Greaves; 8140 Wireless World; Apr. 1984; No. 1579, Sheepan Place, Olchester, Great Britain; pp. 54-57+62.

European Search Report, Application No. EP 91 30 5995; date Dec. 18, 1992.

*Primary Examiner*—Parshotam S. Lall
*Assistant Examiner*—William M. Treat
*Attorney, Agent, or Firm*—Flehr, Hohbach, Test, Albritton & Herbert

[57] ABSTRACT

An IEEE 488 interface couples a microprocessor to one or more devices that are connected to an IEEE 488 bus. Message transmission speed is improved by overlapping a portion of the T1 bus settling time with the microprocessor's write pulse, when it is known that the data on the microprocessor's bus is valid for a predefined period of time before the write pulse's trailing edge. Improved handshake synchronization is achieved by generating an interrupt signal to notify the microprocessor that the last byte of an incoming message has been received. The terminal count signal generated by the microprocessor's DMA controller is used to detect the end of multiple byte messages sent by the microprocessor. The interface automatically generates an EOI signal on the IEEE 488 bus when the last byte of the message is asserted on the IEEE 488 bus data lines. This greatly simplifies the transmission of multiple byte messages by the microprocessor compared with the protocol used by prior art interfaces. The DMA controller's terminal count signal is also used to prevent the loss of data being sent by a device on the IEEE 488 bus to the microprocessor, which typically happens when the microprocessor has to service another device in the midst of receiving a long message from the first device. The loss of data is prevented by detecting a break point in the message transmission, i.e., when the DMA terminal count signal becomes active, and then holding off the first device from asserting "data valid".

12 Claims, 10 Drawing Sheets

IEEE 488 INTERFACE FOR MESSAGE HANDLING METHOD

The invention relates generally to test and measurement systems that use IEEE Standards 488.1 and 488.2 for communication between controllers and instruments. In particular, the invention relates to methods of implementation of some of the functions required to interface a controller or an instrument to the IEEE 488 bus that improve the performance and reliability of the interface.

BACKGROUND OF THE INVENTION

Microprocessors are used today f or performing the internal operations of modern instruments. Additionally, computers and microprocessors are used to control test and measurement systems. The primary method used for interconnecting and communicating between instruments and control computers (controllers) is the IEEE 488 bus.

The IEEE 488 bus is essentially an electrical signal transmission bus with a predefined set of lines. A set of predefined protocols govern the methodology for transferring information over the bus from a controller to specified devices, and vice versa. By using an industry standard bus, the manufacturers of a wide variety of instruments can ensure that standard software packages and interface circuits can be used to connect their instruments to microprocessor based controllers. That is,, purchasers of these instruments do not need to buy a different customized controller for each instrument, because all such instruments use the same set of signal lines and the same set of communication protocols.

Integrated circuits (chips) are used to interface the computer or microprocessor to the IEEE 488 bus. The IEEE 488 interface integrated circuits (IEEE 488 chips) that exist today were designed and developed prior to the publication of the latest instrumentation standards: ANSI/IEEE 488.1-1987 and ANSI/IEEE 488.2-1987, both of which are hereby incorporated by reference. These chips, for the most part, conform to an earlier standard: IEEE Std 488 -1978, also hereby incorporated by reference.

Data Settling Time

A fundamental characteristic of currently available IEEE 488 chips is slow IEEE 488.1 source handshake performance. IEEE 488-1978, as well as the newer IEEE 488.1-1987 standard, defines a data settling time, T1, that is used by all devices (instruments and controllers) that source "multiline" messages (i.e., messages containing multiple bits transmitted parallel) onto the IEEE 488.1 bus. IEEE Standards 488-1978 and 488.1-1987 allow different values for T1, depending on the configuration of the system and on the type of data line drivers used by the device performing the source handshake. Existing IEEE 488 interfaces allow some flexibility for altering the T1 delay, but do not provide implementations for optimum high speed performance. This inability to source multiline messages and data at the highest possible speed allowed by the IEEE 488 specifications results in less than desirable performance in modern test and measurement systems. There exists the need for IEEE 488 interface circuitry which implements a flexible, very high speed source handshake function.

IEEE 488.1 Bus Handshake Synchronization with Microprocessor Application Software Test and measurement application software for controllers is often written in a fashion such that IEEE 488 bus activity is assumed to be quiescent before additional IEEE 488 communications are attempted. With current IEEE 488 chips, this is not always possible to determine without the software taking steps which affect the state of the IEEE 488 bus, such as taking control synchronously. There is a need for application level software to be able to determine when the last byte of a message has been accepted by all of the devices on the IEEE 488 bus, thereby guaranteeing that the bus is quiescent, before proceeding with further IEEE 488 bus communications.

Variable Length Message and the Last Byte

One of the most useful features of the IEEE 488 bus is its ability to easily support variable length messages (i.e., messages and data containing a variable number of bytes). This ability is implemented using the single line END message or using the End Of String (EOS) multiline message. In transferring multiline messages via the IEEE 488.1 bus, intervention is often required at both ends of the communication before the last byte of the message is sent or received. On the sending side of the communication link, the IEEE 488 interface must be instructed to send an END message along with the last byte of the message. On the receiving end, the IEEE 488 interface must be instructed to refuse to accept further message bytes following the next one it receives. In both of these cases, the IEEE 488 device driver software running on the associated microprocessor or computer must provide for the interventions to take place by setting up and completing a transfer one byte less than the intended message length, performing the special IEEE 488 interface instructions, and finally setting up and completing a transfer of the last byte.

It is generally detrimental to the throughput of the system for the software to involve itself in this sort of an intervention. In addition, these intrusive techniques greatly increase the complexity of the driver software. Worse yet, various asynchronous IEEE 488.1 events (such as received END messages) can occur in various time relationships with the multiple transfers and special interface commands, resulting in race conditions which require substantial software effort to avoid.

SUMMARY OF THE INVENTION

In summary, the present invention provides methods for implementing specific IEEE 488 interface functions that dramatically improve the performance and reliability of the IEEE 488 interface of an instrument or controller. The speed of message transmission is improved by overlapping a portion of the T1 bus settling time with the sending microprocessor's write pulse, when it is known that the data on the microprocessor's data bus is valid for a predefined period time before the trailing edge of that write pulse.

The interface of the present invention provides improved handshake synchronization by providing a special state machine that, if enabled, will notify the microprocessor, using an interrupt signal, that the last byte of an IEEE 488 message has been accepted by all listeners on the bus.

The terminal count signal generated by the microprocessor's direct memory access (DMA) controller is used to detect the end of multiple byte messages sent by the microprocessor to a device on the IEEE 488 bus. The interface of the present invention automatically generates an EOI signal on the IEEE 488 bus when the last byte of the message is asserted on the IEEE 488 bus data lines. This greatly simplifies the transmission of multiple byte messages by the microprocessor compared with the protocol used by prior art interfaces.

The DMA controller's terminal count signal is also used to prevent the loss of data being sent by a device on the IEEE 488 bus to the microprocessor, which typically happens when the microprocessor has to service another device in the midst of receiving a long message from the first device. The loss of data is prevented by detecting a break point in the message transmission, i.e., when the DMA terminal count signal becomes active, and then holding off the first device from asserting "data valid" while the microprocessor determines whether it needs to respond to any other devices on the IEEE 488 bus.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

In the Figures and in the description below, the symbol "~" means a logical NOT, the symbol "+" means a logical OR, and the symbol "&" means a logical AND.

Figure 1:
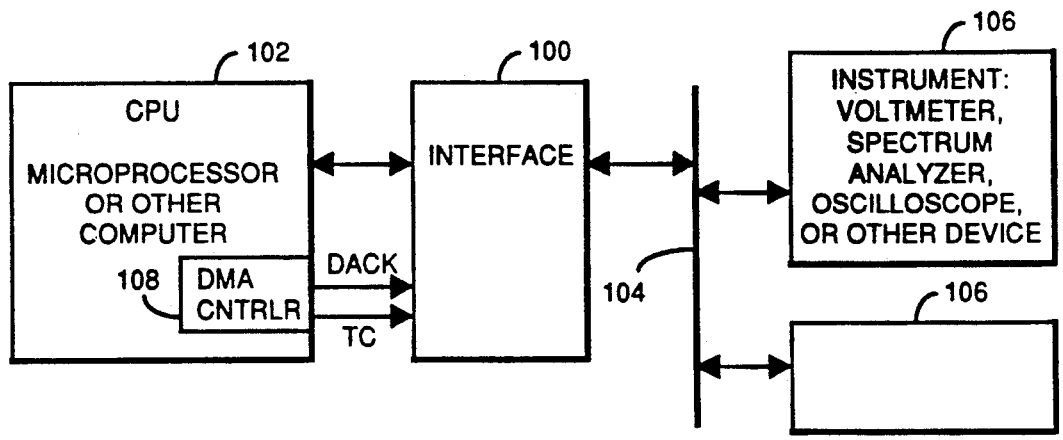
FIG. 1 is a block diagram of a controller coupled to one or more devices via an IEEE 488 interface.

Referring to FIG. 1, there is shown a controller interface 100 which couples a microprocessor controller 102 to an IEEE 488 bus 104, which in turn is coupled to one or more devices 106, such as digital voltmeters,'spectrum analyzers, oscilloscopes, or any other instrument which is designed to send and receive commands and messages via an IEEE 488 bus. Some aspects of the present invention assume that the microprocessor 102 includes a DMA controller 108 which controls DMA data transfers and also outputs a "terminal count" signal TC for indicating the end of a particular data transfer sequence.

The IEEE 488 bus 104 is also called the IIGPIB (general purpose interface bus).

Whenever a signal or signal line name begins with the letter "N", it is a negative logic signal or signal line. To clarify the explanations herein, all signals will be described using positive signal logic terminology.

Figure 2:
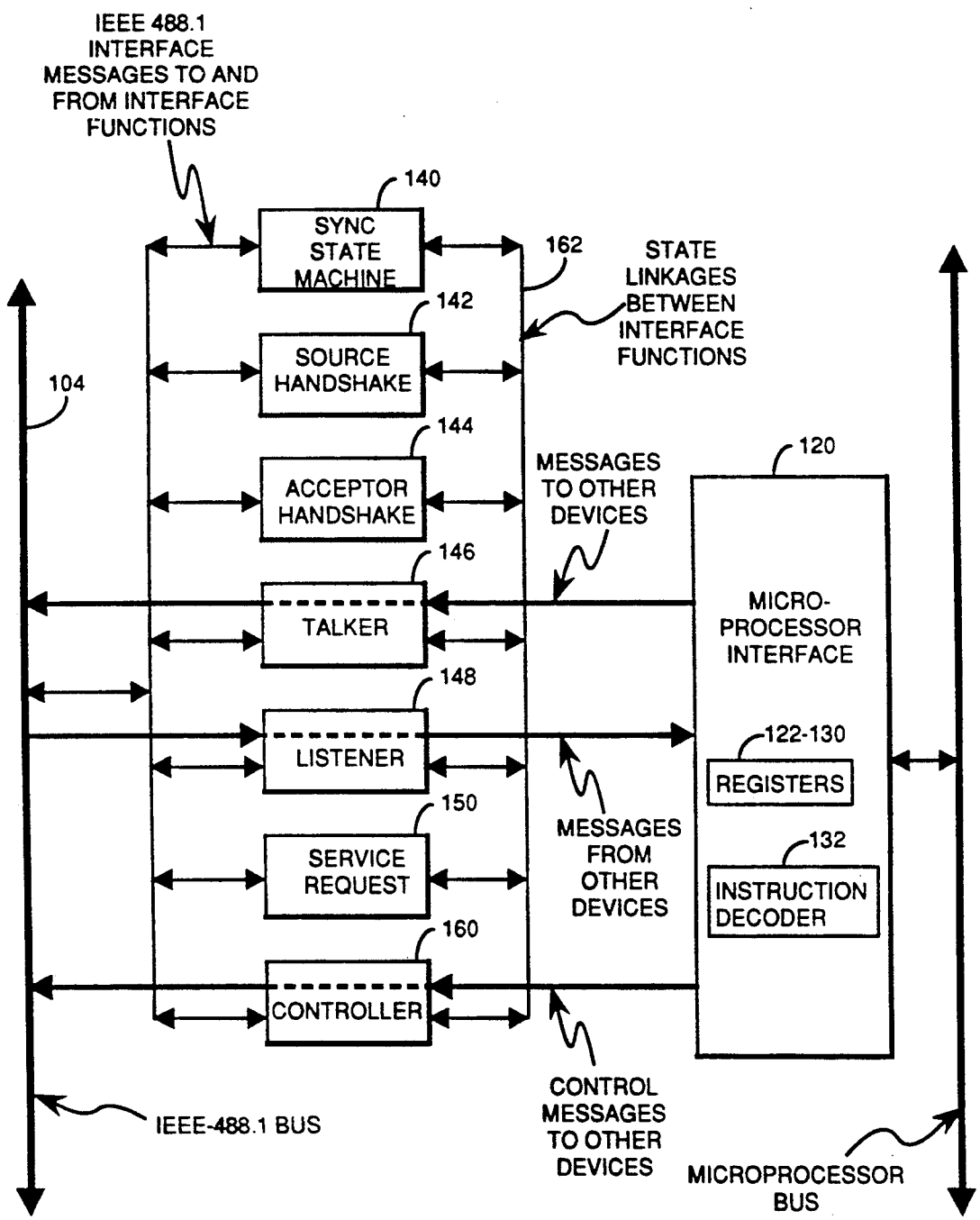
FIG. 2 is a block diagram of the primary components of a controller interface in accordance with the present invention.

Referring to FIG. 2, the controller interface 100 in accordance with the present invention includes two "ports": a microprocessor port 120 and an IEEE 488 bus 104. The preferred embodiment of the invention will be described from the viewpoint of having a microprocessor controller coupled to port 120 and a variety of instruments 106 coupled to the IEEE 488 bus 104. However, it should be understood that this same circuit 100 can be used to couple the microprocessor inside an instrument 106 to the IEEE 488 bus 104. Thus the interface 100 is a general purpose circuit for coupling either an instrument or a controller to the IEEE 488 bus 104.

Figure 3:
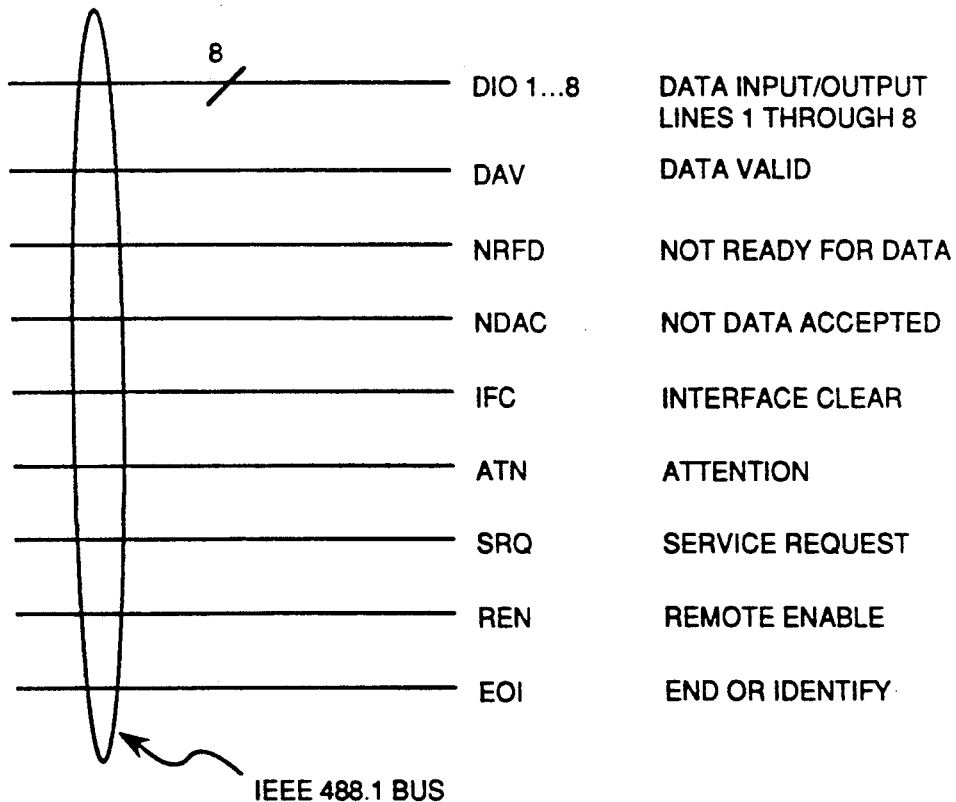
FIG. 3 depicts the signal lines of an IEEE 488 bus.

The structure of the IEEE 488 bus 104 is shown in FIG. 3. As shown, it has the following lines:
1) an eight bit data bus.
2) an NRFD (not ready for data) line which is asserted so as to temporarily prevent the assertion of new data on the bus 104. More specifically, the assertion of the DAV (data valid) signal is prevented.
3) an DAV (data valid) line, which is asserted when a byte of data has been asserted on the bus.
4) an NDAC (not data accepted) line, which becomes logically true when the device receiving a byte of a message accepts the message. When several devices are reading a broadcast message, NDAC becomes true only when the slowest device has accepted delivery of the byte.
5) IFC (interface clear) line, which is asserted to reset a number of device interface functions (i.e.,, state machines in the interface).
6) ATN (attention) line, asserted by the controller before "addressing" one or more of the devices on the IEEE 488 bus. When ATN is asserted a device address is asserted on the data bus.

7) SRQ (service request) line, asserted by devices when they need to be serviced by the controller.

8) REN (remote enable) line, used by the controller to instruct devices on the IEEE 488 bus to begin responding to commands from the controller.

9) EOI (end or identify) line: "end" is used to mark the last byte in a multiline message, and "identify" is used by a controller when identifying devices requesting service.

Figure 4:
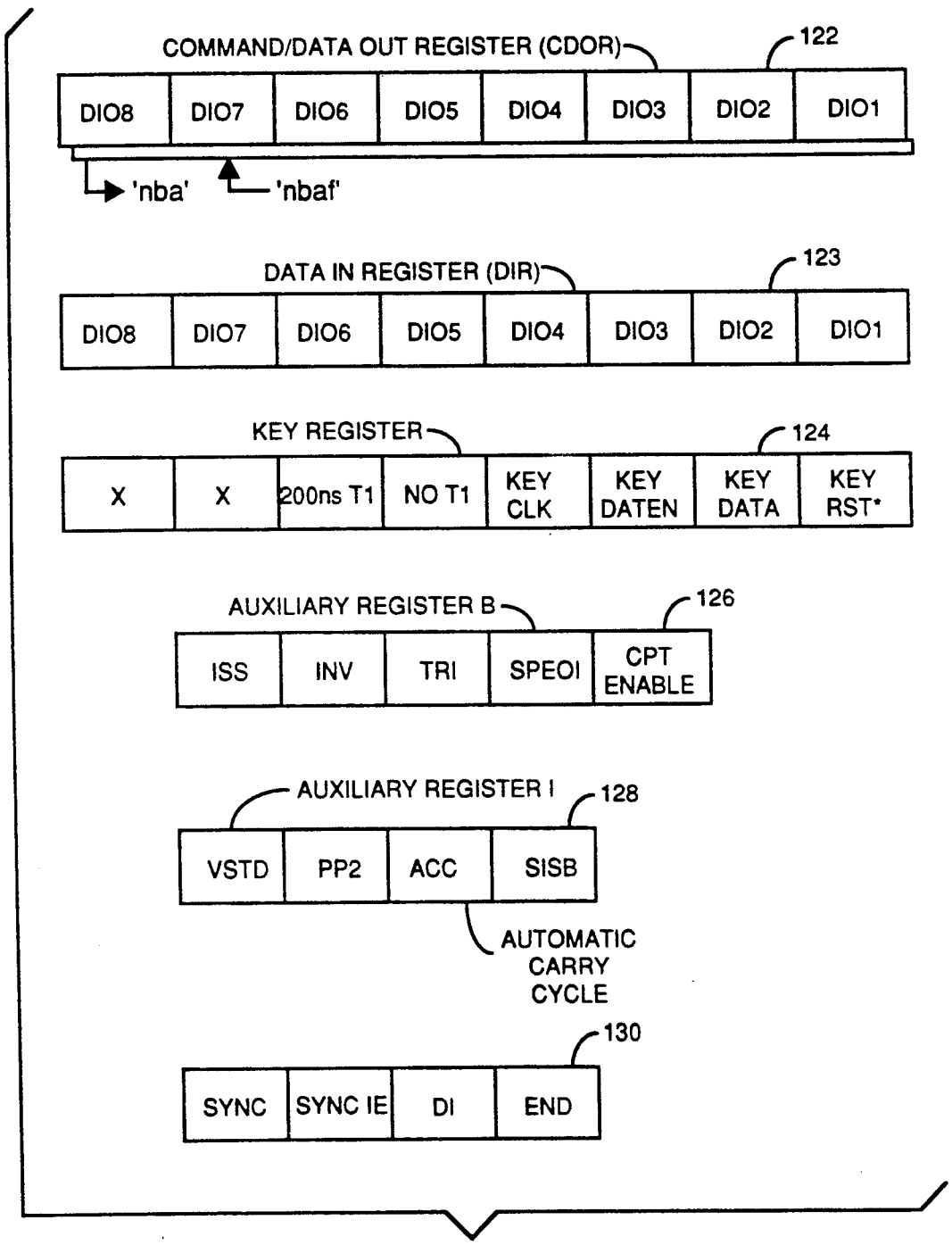
FIG. 4 depicts some of the registers in the microprocessor port of the interface of the present invention.

Microprocessor port 120 contains a set of addressable data registers 122-130 for defining the interface's mode of operation, and for storing commands and messages being transmitted to and from the IEEE 488 bus 104. Referring to FIG. 4, the data registers 122-130 in port 120 include an eight bit Command/Data Out Register (CDOR) 122 which is the general purpose register used for forwarding data, multiline messages, and commands from a controller to the IEEE 488 bus 104. Similarly, there is an eight bit Data In Register (DIR) 123, which is used by the microprocessor 102 to receive data and message bytes from other devices on the IEEE 488 bus 104. The Key Register 124 contains bit flags which specify the mode of communication with a microprocessor. Only the "200 ns T1" bit is relevant to the present invention.

The control circuitry for the CDOR 122 a local message, 'nba' (new byte available), which is true whenever a new byte of data is written into the CDOR.

The Auxiliary Registers B and I 126 and 128 are used for functions not normally required by the IEEE 488 standard, some of which will be described below. Another register 130 stores SYNC and SYNC IE bits, described in more detail below. Other bits in this auxiliary register 130 include the END bit, and the DI (data in) bit. The END bit is set whenever the interface 100 accepts a message byte from a device on the GPIB 104 with the EOI line asserted, indicating that the last byte of a message has been sent. The DI bit is set whenever the interface 100 accepts a message byte from a device on the GPIB 104.

Referring once again to FIG. 2, the microprocessor port 120 also includes an instruction decoder 132 which decodes address, data and read/write signals from the microprocessor bus to generate local commands. The local command signals generated by the decoder 132 which are relevant to the present invention include: cont (continuous mode), rddir (read data in register), wrcdor (write to command/data out register), rdhf (release handshake holdoff), hlda (holdoff on all), hlde (holdoff on end mode), hldi (holdoff immediate), holdoff (holdoff, i.e., stop transmission of further data), pon (power on reset), clear sync (clear SYNC bit to exit SYNC state), set sync (set SYNC bit), seoi (send EOI), and 'nbaf' (new byte available false) which resets the 'nba' (new byte available) signal generated by the CDOR 122.

There is a SYNC state machine 140 used for detecting when the IEEE 488 bus handshake is synchronized. The Source Handshake state machine 142 is used when "sourcing" messages or data to the bus 104. "Sourcing" means that data is being sent from the microprocessor to a device coupled to the GPIB 104.

The Acceptor Handshake state machine 144 is used when accepting (i.e., receiving) multiline messages from a device on the GPIB 104. The Talker state machine 146 is used to control the transmission of device specific messages to devices on the GPIB 104. The Listener state machine 148 is used to control the reception of device specific messages from devices on the GPIB 104.

The Service Request state machine 150 asserts the signal SRQ on the IEEE 488 bus to request services from the active bus controller.

The Controller state machine 160 determines when the Source Handshake State Machine 142 is used to send interface messages (e.g., trigger, clear, and addressing messages) to devices on the GPIB 104. The Controller state machine 160 also handles service requests by devices on the GPIB 104.

The state machines shown in FIG. 2 are interconnected by internal busses and signal lines 162 so that each state machine can use signals from the others.

OVERLAPPING WRITES TO THE CDOR WITH T1 GENERATION

Figure 5A:
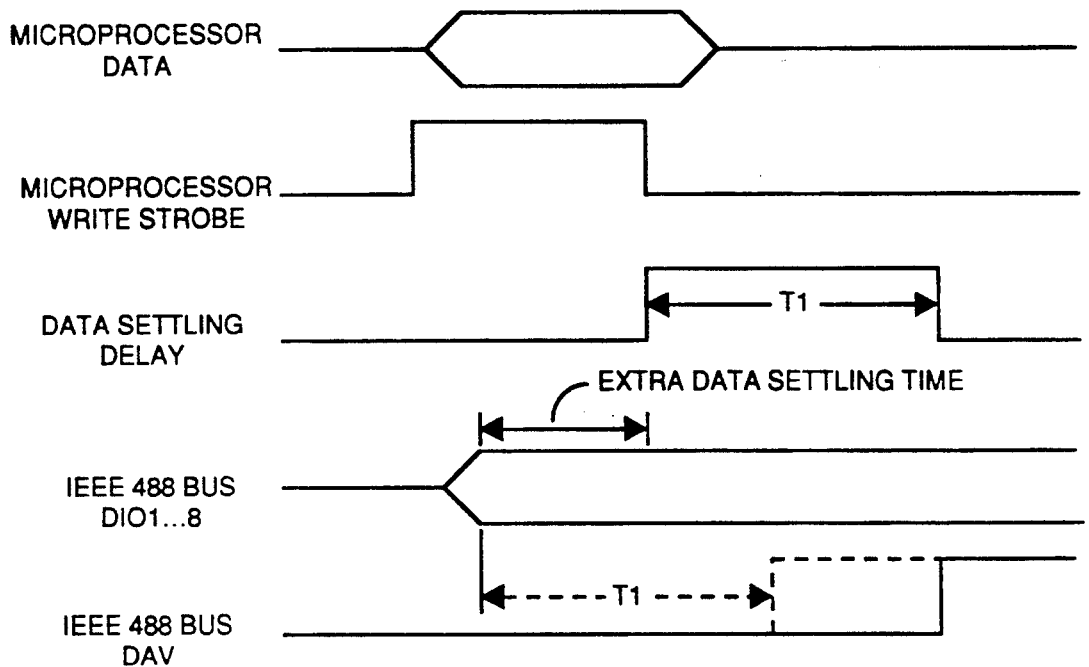
FIG. 5A is a timing diagram for asserting data sent by a microprocessor onto the IEEE 488 bus.
Figure 5B:
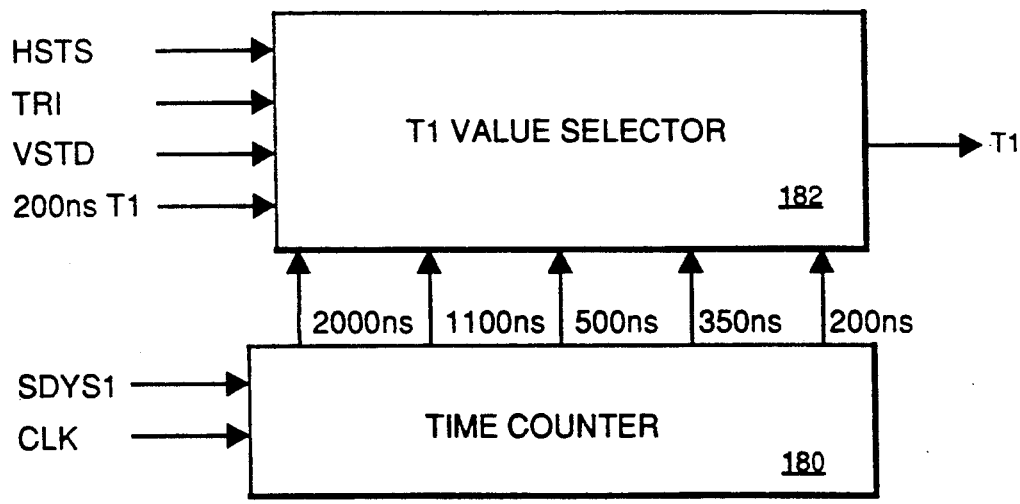
FIG. 5B is a block diagram of the corresponding circuitry.

Referring to FIGS. 5A and 5B, in accordance with the IEEE 488 standard, a data settling period of at least 350 nanoseconds (T1) is required before multiline messages or data sent by a controller are valid on the IEEE 488 bus. It should be noted that in some circumstances the T1 data settling period must be 500 nanoseconds or 2 microseconds, depending on the system configuration. Further, the first byte of each message requires additional settling time.

Prior implementations of IEEE 488 interfaces begin counting this data settling period, called T1, at the trailing edge of the controller's write strobe. However, in many circumstances, data is valid on the microprocessor's data bus for at least 150 nanoseconds before the trailing edge of its write strobe signal. Therefore, the speed of data communications can be improved by overlapping the T1 data settling period with the last 150 nanoseconds of the write strobe, at least in those circumstances where it is known that the data on the controller's bus is valid during that 150 nanosecond period.

The present invention takes advantage of this overlap by setting the 200 ns T1 bit, which, when set, instructs the Source Handshake circuit to count only 200 nanoseconds after the trailing edge of the write strobe instead of 350 nanoseconds.

By implementing the CDOR Register with a transparent latch, we are able to overlap the write of the CDOR with the required data setup on the GPIB (T1 delay). By overlapping, the time required to complete a GPIB transfer is reduced by the width of the overlap. This results in a faster transfer rate across the GPIB.

Command/Data Our Register (CDOR)

As shown in FIG. 4, the Command/Data Out Register (CDOR) is an 8-bit write-only register used to move data from the computer to the GPIB 104 when the interface is the GPIB Talker or the Active Controller. Outgoing data is separately latched by this register and is not destroyed by a read from the DIR (data in register). When a byte is written to the CDOR, the GPIB Source Handshake (SH) function is initiated (i.e., the local message 'nba'—new byte available—is true) and the byte is transferred to the GPIB. This register may also be written by a direct memory access (DMA) controller. The CDOR is a transparent latch, thus changes on the microprocessor's data bus during write cycles to the CDOR are reflected on the GPIB data bus.

Key Register (KEYR)

The Key Register is a write-only register. The bit pattern of the KEYR is shown in FIG. 4. When the 200 ns T1 Delay bit is set by the microprocessor, the interface circuit 100 generates a very short data settling time (200 nanoseconds) when the interface 100 is used to source data onto the GPIB 104.

Auxiliary Register B (AUXRB)

The TRI bit in AUXRB determines the interface circuit's Source Handshake Timing, T1. TRI can be set by the microprocessor to enable high speed data transfers (T1 > = 500 nsec) when tristate GPIB drivers are used. Setting TRI enables high-speed timing as T1 of the Source Handshake after transmission of the first data byte. Clearing TRI enables low-speed timing (T1 > = 2 microseconds). The T1 delay can be reduced further by setting the VSTD bit in AUXRI or by setting the 200 ns T1 bit in KEY Register 124.

Auxiliary Register I (AUXRI)

Setting the VSTD bit in AUXRI sets the value of the T1 delay used by the source handshake function for data setup to 350 nsec for the second and subsequent data bytes sent after ATN unasserts. If this bit is cleared, the value of T1 is determined by the TRI bit in AUXRB.

Source Handshake (SH)

Figure 6:
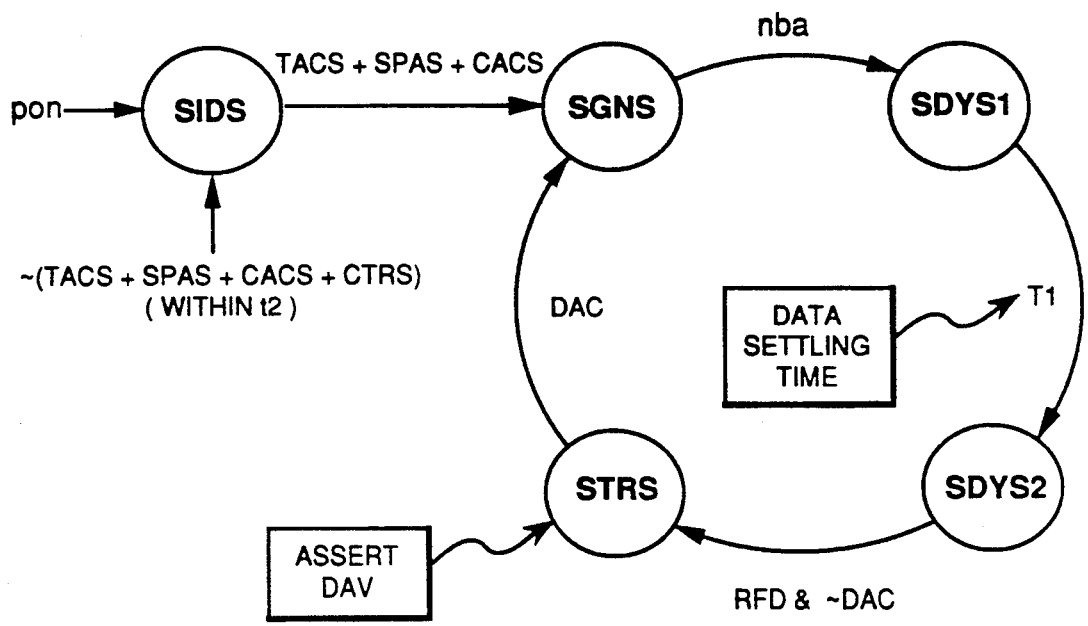
FIG. 6 shows the state diagram for the Source Handshake function.

The Source Handshake state machine differs from the state diagram shown in the IEEE 488.1. Specification. States SWNS and SIWS are removed. These states recorded the false transition of the local message new byte available ('nba'). The source handshake state diagram for the preferred embodiment is shown in FIG. 6.

Source Idle State (SIDS): In SIDS the Source Handshake function is disabled. The Source Handshake function powers on in SIDS and goes from SIDS to SGNS whenever the interface 100 is in a state (Taken Active State(TACS), Serial Port Active State(SPAS), or Controller Active State(CACS)) where it needs to source bytes onto the GPIB 104. The Source Handshake function returns to SIDS within t2 if none of these states is active (t2 is specified and defined in IEEE Std 488.1).

Source Generate State (SGNS): In SGNS the interface 100 is driving the CDOR onto the DIO lines of the GPIB 104, but is waiting for either a command byte, data byte, or serial port response to become available before issuing a new byte available ('nba') message. The Source Handshake function goes from SGNS to SDYS1 when the local message 'nba' becomes true.

Source Delay State 1 (SDYS1): In SDYS the Source Handshake function is driving the new byte in the CDOR onto the DIO lines of the GPIB 104 for a time of at least T1. The SH function leaves SDYS1 and enters SDYS2 after a time of T1 has elapsed.

Source Delay State 2 (SDYS2): In SDYS2 the DIO lines have already been driven with valid data for at least T1, and the SH function is waiting for all listeners to unassert NRFD (not ready for data) before asserting DAV (data valid). The SH function leaves SDYS2 and enters STRS as soon as no listeners are asserting NRFD.

Source Transfer State (STRS) : In STRS the SH function is asserting DAV, indicating that the data on the GPIB DIO lines is valid. The SH function leaves STRS and returns to SGNS once all listeners have unasserted NDAC (not data accepted).

When 'nba' is true, the source handshake function transitions from SGNS to SDYS1.

Figure 7:
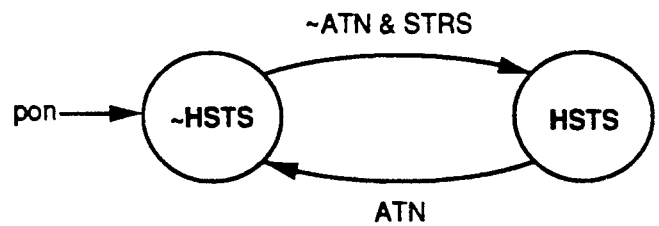
FIG. 7 shows the High-Speed T1 state diagram (HSTS), which determines the length of the data setup time on the IEEE 488 bus along with the bits TRI, VSTD, and 200 ns T1.

The source handshake function remains in SDYS1 driving the contents of the CDOR on the GPIB DIO lines for the amount of time specified by the T1 time delay. T1 is determined by the value of the TRI, VSTD and 200 ns T1 bits and by HSTS (see FIG. 7 and the following Table) . HSTS is entered after the first data byte after ATN unasserts is sent. This enables a shorter bus settling time for all subsequent bytes until ATN becomes true. HSTS is always FALSE when the interface is the active controller (i.e., when ATN is asserted).

| 200 ns T1 Bit | TRI | VSTD | ~HSTS T1 Delay for Commands and 1st Data Byte | HSTS T1 Delay for Subsequent Data Bytes |
|---|---|---|---|---|
| 0 | 0 | 0 | 2.0 usec. | 2.0 usec. |
| 0 | 0 | 1 | 1.1 usec. | 1.1 usec. |
| 0 | 1 | 0 | 2.0 usec. | 500 ns |
| 0 | 1 | 1 | 1.1 usec. | 350 ns |
| 1 | X | X | Same as above | 200 ns + width of overlap |

Note that all the time values in the above chart are delay periods subsequent to the trailing edge of the write pulse. Thus, if TRI and VSTD are set and 200 ns T1 is clear, there is still a 150 ns overlap, plus 350 ns delay after the trailing edge of the write pulse, which together meet the 500 ns T1 delay required by the IEEE 488 specification.

As shown in FIG. 5B, this scheme is implemented by using a multiple output time counter 180 which outputs five potential T1 trigger signals. The counter 180 is enabled only when the Source Handshake state machine (see FIG. 6) is in the SDYS1 state. A simple multiplexer 182 selects the proper signal one of these five signals, based on the values of the HSTS, TRI, VSTD and 200 ns T1 signals, and outputs it as the T1 signal, which is used to transistion from SDYS1 to SDYS2 in the Source Handshake state machine.

After the amount of time specified by T1 has elapsed, SDYS2 is entered.

GPIB HANDSHAKE SYNCHRONIZATION DETECTION

The present invention provides an enhancement to multibyte message processing by an IEEE 488 interface. More specifically, it provides a method of notifying the microprocessor, using an interrupt signal, that the last byte of an IEEE 488 message has been accepted by all listeners on the bus. To activate this enhanced function, the microprocessor writes a "1" into the SYNC IE (synchronization interrupt enable) bit of the register 130, shown in FIG. 4. When the SYNC IE bit is set, and the SYNC state machine (shown in FIG. 2) enters the SYNC state, an interrupt signal is sent to the microprocessor, notifying it that the end of the message has been reached.

SYNC Function

The SYNC function is not defined in IEEE Std 488. It controls a special SYNC bit in the interface circuit, which indicates that the GPIB has synchronized at the end of a transfer (the GPIB is said to be synchronized when DAV is unasserted after the last byte transferred). The SYNC bit is set at the completion of a transfer when the GPIB handshaking is complete.

The SYNC function may actually be implemented as one state machine with very complex terms for its transitions, but since its usage is substantially different for DMA (direct memory access) reads, DMA writes, programmed I/O reads, and programmed I/O writes, four separate state diagrams are presented in the Figures. In all cases, the SYNC bit is set only in the SYNC state. Furthermore, an interrupt is generated (for prompting the microprocessor) only if the SYNC bit is set and the microprocessor has previously set the SYNC IE bit.

Programmed I/O Write SYNC Function

Figure 8:
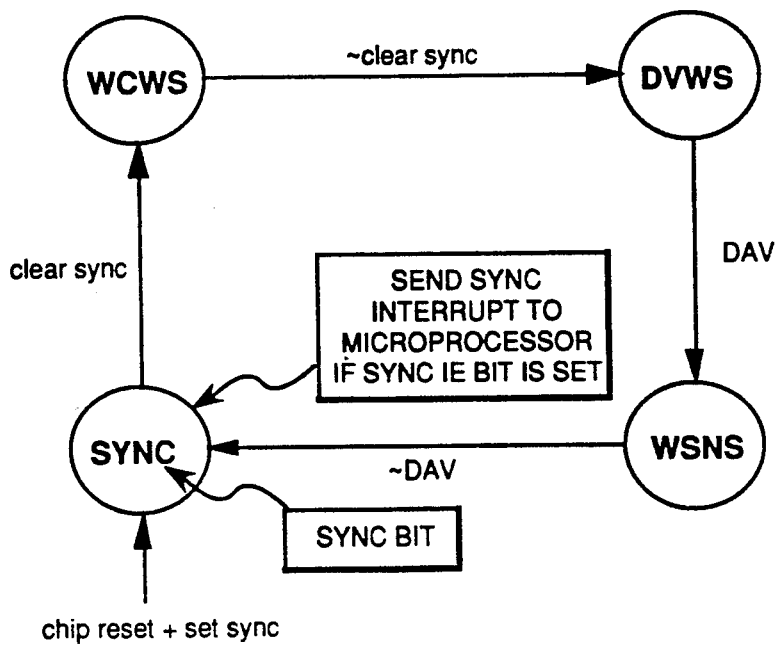
FIG. 8 is a representation of the GPIB synchronization state machine when the interface is in the programmed input/output (I/O) write mode.

The state diagram for the programmed I/O write version of the SYNC state machine is shown in FIG. 8. For the SYNC state machine to be in this mode the interface circuit must be in TACS (talker active state) or CACS (controller active state), and must not be using DMA for sourcing messages.

Synchronized State (SYNC): In SYNC, the interface 100 is done with its current data transfer, the GPIB is synchronized, and the SYNC bit is set. The state machine exits SYNC and goes to WCWS if the SYNC bit is cleared (a 'clear sync' pulse is issued.) The microprocessor's driver software should issue a 'clear sync' command, which causes the interface to generate a 'clear sync' pulse that clears the SYNC bit before writing the last data byte of a programmed I/O transfer to the CDOR.

Write Cycle Wait State (WCWS): In WCWS the 'clear sync' pulse is true, but the state machine is waiting for the 'clear sync' pulse to become false. The state machine goes from WCWS to DVWS as soon as the 'clear sync' pulse becomes false.

Data Valid Wait State (DVWS): In DVWS the state machine is waiting for the byte to be sourced. The state machine exits DVWS and enters WSNS when DAV (data valid) is asserted (the last byte is being sourced).

Wait for Synchronization State (WSNS): In WSNS, DAV is asserted for that last byte of the transfer and the state machine is waiting for DAV to unassert before setting the SYNC bit. The state machine returns to the SYNC state when DAV becomes false.

DMA Writes SYNC Function

Figure 9:
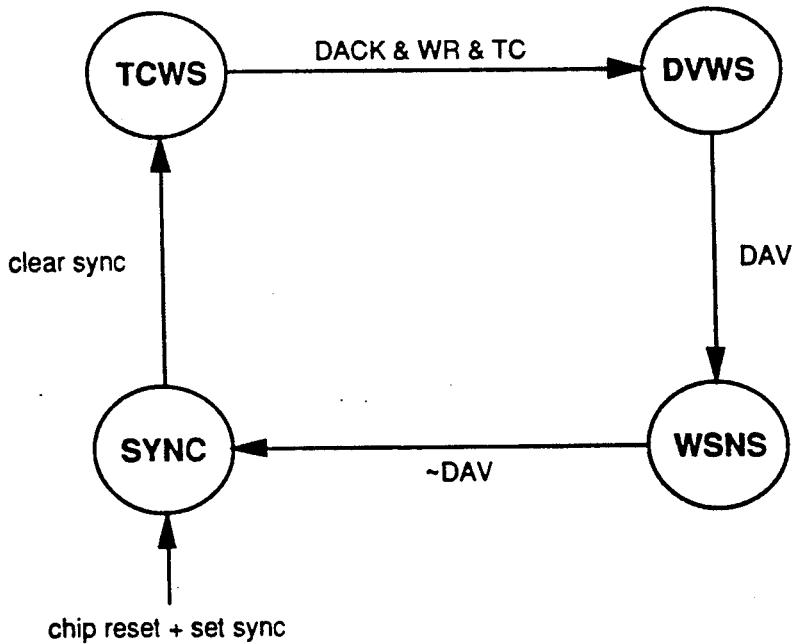
FIG. 9 is a representation of the GPIB synchronization state machine when the interface is in the direct memory access (DMA) write mode.

The state diagram for the SYNC state machine during DMA writes is shown in FIG. 9. For the SYNC state machine to be in this mode the interface must be in TACS or CACS.

Synchronized State (SYNC): In SYNC, the interface is done with its current data transfer, the GPIB is synchronized, and the SYNC bit is set. The SYNC state machine exits SYNC and goes to TCWS if a 'clear sync' command is issued. The driver software should clear the SYNC bit before beginning a DMA write operation.

Terminal Count Wait State (TCWS) In the WCWS state, the SYNC state machine is waiting for a DMA write access to the CDOR with TC (terminal count) asserted (when the last byte of the DMA transfer is written to the CDOR). The SYNC state machine goes from TCWS to DVWS as soon as the DMA controller in the microprocessor writes the last byte of the message to the CDOR (as indicated by the TC signal).

Data Valid Wait State (DVWS): In DVWS the last byte has been written to the CDOR and the SYNC state machine is waiting for the byte to be sourced. The SYNC state machine exits DVWS and enters WSNS when DAV is asserted (the last byte is being sourced).

Wait for Synchronization State (WSNS): In WSNS, DAV is asserted and the SYNC state machine is waiting for DAV to unassert before setting the SYNC bit. The SYNC state machine returns to the SYNC state when DAV becomes false.

For the SYNC function to be useful during DMA write operations the DMA controller must be capable of asserting the TC signal during the write cycle of the last byte to the CDOR.

Programmed I/O Reads SYNC Function

Figure 10:
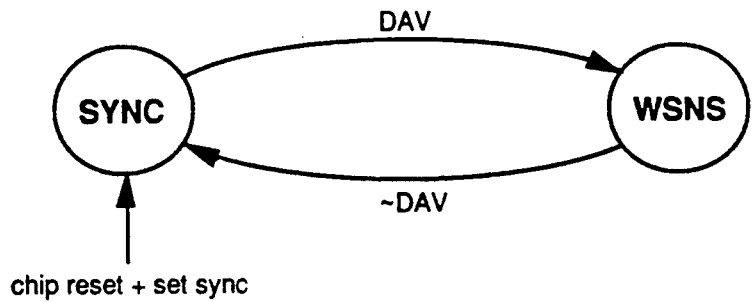
FIG. 10 is a representation of the GPIB synchronization state machine when the interface is in the programmed I/O read mode.

The state diagram for the SYNC state machine during programmed I/O reads is shown in FIG. 10. For the SYNC state machine to be in this mode the interface must be in LACS (listener active state).

Sync State (SYNC): In SYNC, the interface 100 is done with its current data transfer, the GPIB is synchronized, and the SYNC bit is set. The SYNC state machine exits SYNC and goes to WSNS when DAV is asserted.

Wait for Synchronization State (WSNS): In WSNS, DAV is asserted. The SYNC state machine returns to SYNC if DAV is unasserted. Note that during a programmed I/O read, the SYNC bit is set when DAV is false and cleared when DAV is true.

The SYNC bit will toggle with every byte during programmed I/O reads, therefore, the SYNC bit should not be polled or enabled for interrupts until after reading the last byte of a transfer from the DIR. The 'clear sync' command should not be issued during programmed I/O reads.

DMA Reads SYNC Function

Figure 11:
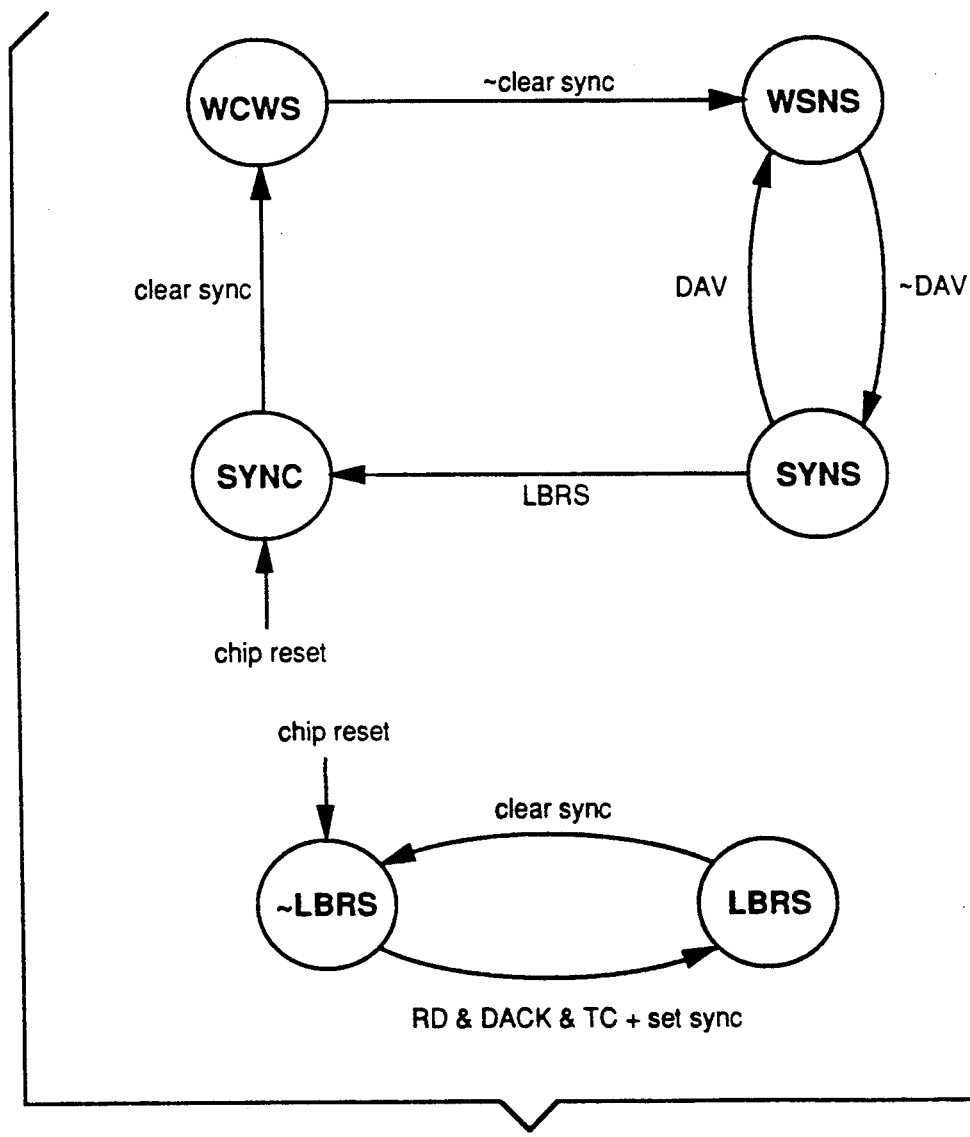
FIG. 11 is a representation of the GPIB synchronization state machine when the interface is in the DMA read mode.

The state diagram for the SYNC state machine during DRA reads is shown in FIG. 11. For the SYNC state machine to be in this mode the interface must be in LACS.

Sync State (SYNC): In SYNC, the interface 100 is done with its current data transfer, the GPIB is synchronized, and the SYNC bit is set. The SYNC state machine exits SYNC and goes to WCWS if the SYNC bit is cleared (the 'clear sync' command is issued). The driver software should clear the SYNC bit before beginning a DMA transfer.

Write Cycle Wait State (WCWS): In WCWS the 'clear sync' pulse is true, but the SYNC state machine is waiting for the 'clear sync' pulse to become false. The SYNC state machine goes from WCWS to WSNS as soon as the 'clear sync' pulse is false.

Wait for Synchronization State (WSNS): In WSNS, the 'clear sync' pulse has been received and DAV is asserted. The SYNC state machine leaves WSNS and enters SYNS when DAV unasserts.

Synchronization State (SYNS): In SYNS the GPIB is synchronized (DAV is not asserted). The SYNC state machine exits SYNS and enters WSNS if DAV is asserted. If LBRS is active (which means that the last byte of the DMA transfer has been read by the DMA controller) the SYNC state machine exits SYNS and returns to SYNC.

Not Last Byte Read State (~LBRS): In ~LBRS the SYNC state machine is waiting for the DMA controller to read the last byte of the DMA transfer. The SYNC state machine exits ~LBRS and enters LBRS when the 'set sync' command is issued or the DIR was read via a (DMA Controller) DACK access while TC (terminal count) is true.

Last Byte Read State (LBRS): In LBRS the last byte of the DMA transfer has been read from the DIR or the set sync command has been issued. The SYNC state machine exits LBRS and returns to ~LBRS when the processor issues a 'clear SYNC' command.

Once started the SYNC function will toggle between WSNS and SYNS for each byte. While in SYNS the function will transfer to SYNC if LBRS is true. This will happen automatically if terminal count is reached while reading the last byte from the DIR (data input register). However, if this does not happen (i.e. a timeout or early END is detected) then LBRS can be set by issuing the 'set sync' command, which will cause the SYNC bit to set (i.e., the GPIB is synchronized).

HANDSHAKE HOLDOFF AND AUTOMATIC LAST BYTE HANDLING ON DMA TRANSFERS

IEEE std 488 defines a local message, rfd (ready for data), which is issued before each byte of data is received by the microprocessor. The 'rfd' message is transmitted on the NRFD line of the bus (see FIG. 3) Issuance of this local message affects GPIB signal lines in such a way as to permit the talker to send the next data byte over the GPIB. In order to achieve maximum data transmission rates, this local message is asserted automatically during a data transfer cycle whenever the interface is ready to receive another byte.

After the last byte of a data transfer, however, it is necessary for the microprocessor to inhibit the local 'rfd' message, thereby preventing the talking device from sending further bytes. For example, if the application running in the microprocessor requested to read 100 bytes from a device, and for some reason the device had more than 100 bytes to send, transmission of the 101st byte must be inhibited until the application specifically requests more bytes. Since at the moment when the 100 bytes have been received it is unknown to the microprocessor whether the application needs or wants further bytes, or whether the application intends to cause subsequent bus activity, the safest course is to inhibit the arrival of further bytes.

In order to block the arrival of further bytes, prior art devices have required software intervention between the next-to-last and last bytes of a transfer, effectively instructing the interface to fail to issue the 'rfd' local message after the next (i.e., last) byte is received. This software is not only detrimental to system performance, but greatly increases the complexity of the driver software controlling the interface. It requires that all incoming data transfers be broken into two parts: the first n−1 bytes are to be transferred as a group, usually by DMA, followed by a second transfer of one byte. Between the two transfers, the software in the microprocessor instructs the interface to fail to issue the standard 'rfd' message. In addition to the complexity of breaking up a transfer, there are asynchronous GPIB events (such as incoming END messages) which may occur between the two parts, and which cause various race conditions which, using prior art devices alone, can require extremely complex software to avoid.

The present invention alleviates the need for this software intervention by allowing the last-byte 'rfd' inhibition commands to be preprogrammed before the entire transfer begins. The entire transfer may then occur without the need to break it up, and the interface will correctly program itself before the last byte to inhibit the 'rfd' message. This feature, therefore, increases throughput and greatly decreases software complexity by eliminating the software intervention previously required by prior art devices.

A similar situation exists for write operations (data being transmitted to a device over the GPIB). Before the last byte is sent, the IEEE 488 interface must be programmed to send the END message along with the last byte by asserting the EOI line of the GPIB. In order to accomplish this programming with prior art interfaces, software intervention was required as described above, and similar decreases in throughput and increases in software complexity are experienced. With the present invention, however, this last-byte programming can be set up in advance, allowing the entire transfer to occur with no software intervention.

The direct memory access (DMA) controller in a microprocessor contains a counter that is used to determine when the last word or byte of a DMA transfer has been reached. The DMA controller outputs a signal, herein called TC, which is asserted when the DMA controller's counter reaches the value for the last word or byte to be read or written by the microprocessor. As will be described below, this TC signal is used by the present invention to trigger a handshake holdoff when data is being accepted from the GPIB, and to trigger the generation of an END message when data is being sourced to the GPIB. Setting the ACC bit enables automatic carry cycles on GPIB DMA transfers. When the ACC bit is set during GPIB DMA reads, the acceptor handshake function will perform a RFD (ready for data) holdoff on the last byte read by the DMA controller (that is, the byte in which the TC signal is pulsed when read). Issuing the 'Finish Handshaker' auxiliary command releases the holdoff.

Acceptor Handshaker

Figure 12:
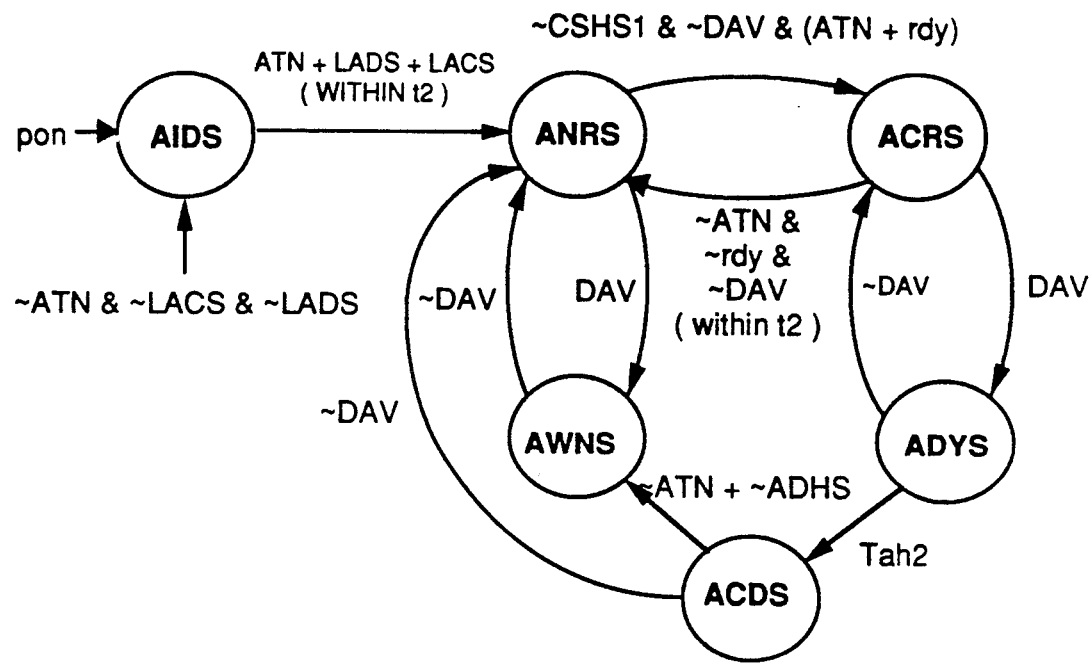
FIG. 12 shows the state diagram for the Acceptor Handshake function. The state of the Acceptor handshake is also effected by the state machines in FIGS. 13-17.

The Acceptor Handshake state diagram for the IEEE 488 interface 100 is shown in FIG. 12. The following chart lists the outputs and actions of each of the acceptor handshake states.

| STATE | RFD | DAC | Other Actions |
| --- | --- | --- | --- |
| AIDS | (T) | (T) | Acceptor Handshake is idle |
| ANRS | F | F | RFD Holdoff State |
| ACRS | (T) | F | Ready To Accept Data State |
| ADYS | F | F | If ATN is false |
| | | | latch data into the DIR |
| | | | set the DI (Data In) bit and |
| | | | END bit if appropriate |
| | | | If ATN is true |
| | | | commands decoded and |
| | | | appropriate interrupts set |
| | | | SDHS set if commands require |
| | | | DAC (data accepted) holdoff |
| ACDS | F | F | DAC Holdoff State |
| AWNS | F | (T) | Waiting for DAV to unassert (new cycle to begin) |

The implementation of the Acceptor Handshake in the present invention differs from the state diagram shown in the IEEE 488.1 Specification. The IEEE 488.1 state ACDS is divided into two states ADYS and ACDS. ADYS is entered after DAV is asserted and is the state in which data is strobed into the DIR and action is taken on the reception of GPIB commands. All interrupt status bits generated by the acceptor handshake are set by this state. The ACDS state is entered one clock cycle (Tah2) after ADYS is entered and is used as a holding state where the device will remain during DAC (data accepted) holdoffs. ANRS is the RFD holdoff state. To release the RFD holdoff either ATN must be asserted or the local message 'rdy' must be cleared. The 'rdy' local message is defined as:

$$rdy = \sim ANHS1 \& \sim ANHS2 \& \sim rddir \& \sim rhdf$$

If the acceptor handshake function is in ACRS and ATN is false, issuing a 'rhdf' or 'hldi' command or reading the DIR (rddir) causes a transition to ANRS. This transition is NOT permitted by the IEEE 488 specification. Therefore it is the responsibility of the control program not to perform the actions mentioned above while in ACRS.

Figure 13:
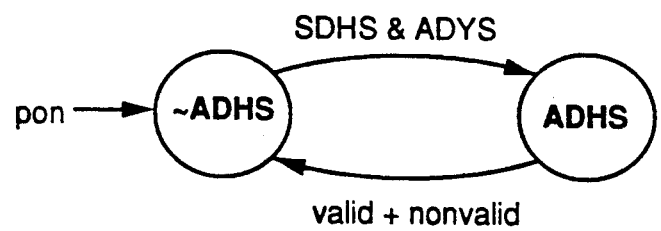
FIG. 13 shows the state diagram which determines the value of the signal ADHS (Acceptor DAC Hold-off State).

The Acceptor Handshake state machine uses five more state diagrams to implement the acceptor handshake function. The ADHS state diagram shown in FIG. 13 is used to perform DAC holdoffs. ADHS is set if a command is received that the interface circuit 100 has been configured to perform a DAC holdoff (represented by SDHS in the state diagram). When ATN is asserted and ADHS is true the acceptor handshake will remain in ACDS until ADHS or ATN go false. The DAC holdoff can be released by issuing the 'valid' or 'nonvalid' commands which clears ADHS. FIG. 13 shows the state diagram of the DAC Holdoff function.

Figure 14:
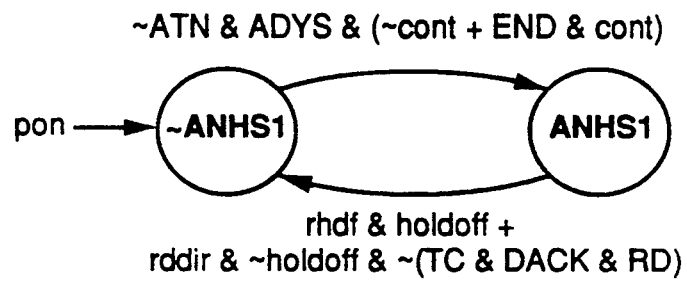
FIG. 14 shows the state diagram which determines the value of the signal ANHS1 (Acceptor NRFD Hold-off State 1).

Four separate state diagrams (ANHS1&2, AEHS and CCHDF) are implemented to perform RFD holdoffs. ANHS1 (shown in FIG. 14) is set in ADYS when ATN is false. ANHS1 indicates that a data byte was received and a RFD holdoff will occur to prevent the next data byte from being sent. The holdoff will be released when the data byte is read from the DIR unless one of several special holdoff conditions are enabled. The special holdoff conditions (represented by holdoff in the state diagram) include holdoff on all (hlda) mode, continuous (cont) mode, holdoff on end (hlde) mode and AEHS set, ANHS2, or CCHDF. If one of the special holdoff conditions is set then a release handshake holdoff (rhdf) auxiliary command must be issued to release the RFD holdoff. Where:

$$holdoff = hlda + cont + hlde \& AEHS + CCHDF$$

Figure 15:
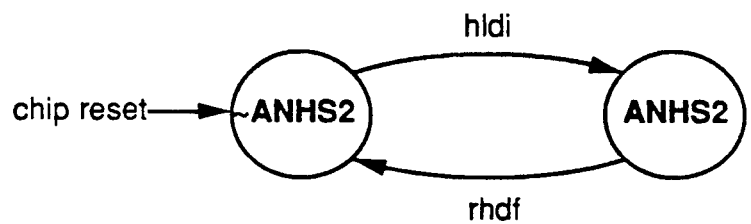
FIG. 15 shows the state diagram which determines the value of the signal ANHS2 (Acceptor NRFD Hold-off State 2).

The ANHS2 state diagram shown in FIG. 15 is used to holdoff the handshake immediately. ANHS2 is set by issuing the 'holdoff immediately' (hldi) auxiliary command and is cleared by issuing the 'release handshake holdoff' (rhdf) command. ANHS2 is not cleared by a 'pon' (power on reset), therefore it allows the control program to issue a 'holdoff immediately' (hldi) command while 'pon' is set and the interface circuit is being configured.

Figure 16:
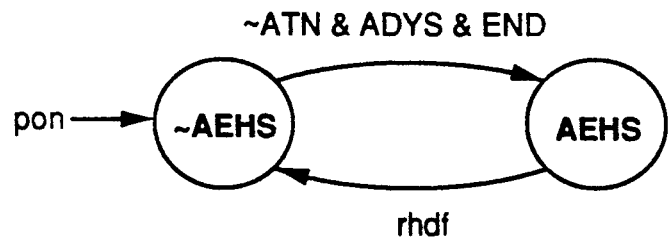
FIG. 16 shows the state diagram which determines the value of the signal AEHS (Acceptor END Hold-off State).

The AEHS state diagram (shown in FIG. 16) is implemented to record the reception of an END condition and allow a RFD holdoff to be performed afterward. AEHS is set on the reception of an END condition (i.e., when the last byte of the message is received) and is cleared when a 'release handshake holdoff' (rhdf) command is issued.

Figure 17:
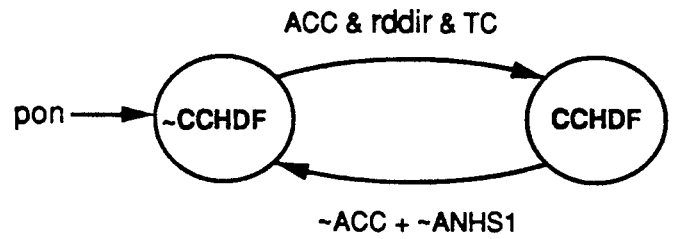
FIG. 17 shows the state diagram which determines the value of the signal CCHDF (Carry Cycle Holdoff Function). This state machine implements the last byte handling feature during read cycles with terminal count.

The Carry Cycle Holdoff State Diagram (shown in FIG. 17) is implemented to record the occurrence of a DMA Read of the DIR (rddir) with TC asserted and allows a RFD holdoff to be performed afterward if the automatic carry cycle bit (ACC) is set. CCHDF is cleared when the ACC bit is cleared or ANHS1 is false.

EOI Generation Function

Figure 18:
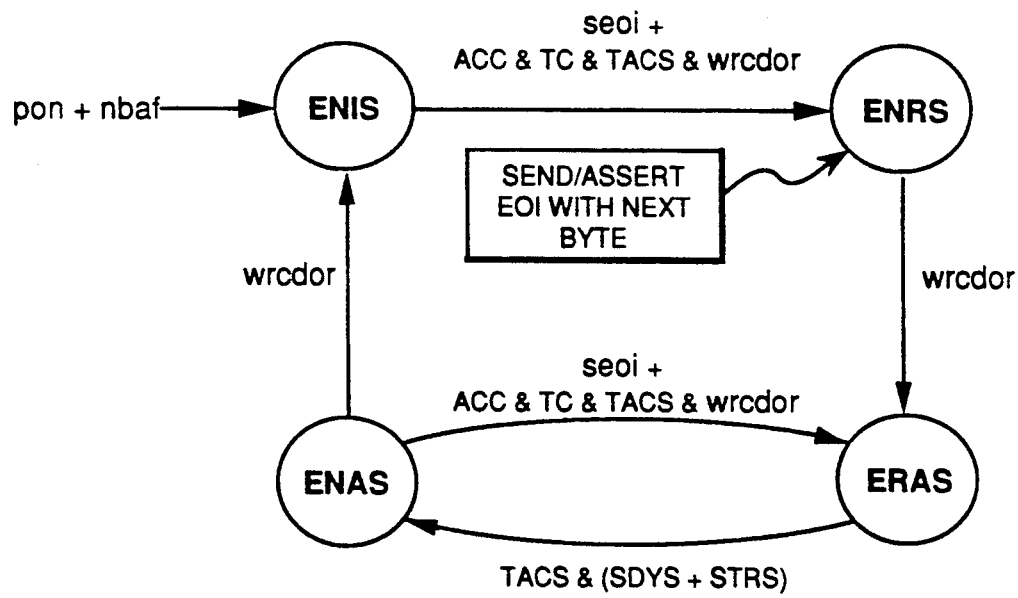
FIG. 18 shows the state diagram which generates the GPIB bus signal EOI (END-OR-IDENTIFY).

The EOI Generation state diagram is shown in FIG. 18. The EOI Generation state diagram is used to control the assertion of EOI by the interface while sourcing a data byte. If the 'Send EOI' auxiliary command (seoi) is issued followed by a write of the CDOR (wrcdor) while the interface is in TACS (talker active state), the EOI Generation state machine will enter ERAS and assert the GPIB EOI line. The function will enter ENAS as soon as the source handshake enters SDYS1+SDYS2. EOI will remain asserted while in (ERAS or ENAS) and in (SDYS or STRS). If it is desired to send EOI with the next byte, then I 'seo' must be issued before the CDOR is written to return the function to ERAS. The next write to the CDOR (wrcdor) will cause the function to enter ENIS.

The auxiliary command 'nbaf' (new byte available false) and the local message 'pon' always clear the EOI Generation function, forcing it into its idle state, ENIS.

When the automatic carry cycle feature is enabled (ACC = 1) the EOI generation function will make the transition from ENIS to ENRS or ENAS to ERAS when the CDOR is written (wrcdor) with the TC signal asserted while in TACS. This will cause EOI to assert while sending the GPIB data written to the CDOR.

Alternate Embodiments

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A bus interface which couples a microprocessor to an IEEE 488 bus, the interface comprising:

a microprocessor port which transmits and receives data to and from said microprocessor; said microprocessor port including microprocessor data bus lines and a write line for receiving write pulses from said microprocessor; each said write pulses having a predefined duration and a trailing edge;

an IEEE 488 bus; said IEEE 488 bus including data lines and a data valid (DAV) line;

talker circuit means, coupled to said microprocessor port and said IEEE 488 bus, for asserting data received by said microprocessor port onto said IEEE 488 bus; said talker circuit means including a transparent latch for asserting and latching data received from said microprocessor port onto said IEEE 488 bus such that data received from said microprocessor port is asserted onto said IEEE 488 bus before the trailing edge of said write pulses; and source handshake means, coupled to said talker circuit means and said IEEE 488 bus, for asserting a signal on said DAV line of said IEEE 488 bus after said talker circuit has asserted data on said IEEE 488 bus for a first predefined minimum settling period; said source handshake means including speedup means that, when enabled, asserts said signal on said DAV line of said IEEE 488 bus after said talker circuit has asserted data on said IEEE 488 bus for a second predefined settling period that is less than said first predefined minimum settling period;

whereby speed of transmission of data by said microprocessor is improved by reducing said settling period.

2. The interface set forth in claim 1, said interface including a speedup enable switch for enabling said speedup means.

3. A bus interface that couples a microprocessor having a direct memory access controller to an IEEE 488 bus, the interface comprising:
- a microprocessor port that transmits and receives data to and from said microprocessor; said microprocessor having an interrupt signal port; said microprocessor port including at least one line for transmitting interrupt signals to said interrupt signal port of said microprocessor;
- an IEEE 488 bus; said IEEE 488 bus including data lines and a data valid (DAV) line;
- listener circuit means, coupled to said microprocessor port and said IEEE 488 bus, for transmitting data from said IEEE 488 bus to said microprocessor via said microprocessor port; and
- acceptor handshake means, coupled to said listener circuit means and said IEEE 488 bus, for detecting when the last byte of a data transfer has been received from said IEEE 488 bus while said listener circuit means is transmitting data to said microprocessor via said microprocessor port and for then transmitting a first interrupt signal to said interrupt signal port of said microprocessor via said microprocessor port; and
- synchronization means, coupled to said IEEE 488 bus, for detecting when a data valid signal previously asserted on said DAV line is unasserted, and for then transmitting a second interrupt signal to said interrupt signal port of said microprocessor via said microprocessor port; and
- a synchronization interrupt enable switch for enabling said synchronization means to send said second interrupt signal to said microprocessor; wherein said synchronization means does not send said second interrupt signal when a data valid signal previously asserted on said DAV line is unasserted unless said synchronization interrupt enable switch is enabled; said synchronization interrupt enable switch coupled to said microprocessor via said microprocessor port so that said microprocessor can enable and disable said synchronization interrupt enable switch;
- whereby said microprocessor is automatically notified by said first interrupt signal that the last byte of a data transfer has been transmitted by said interface from said IEEE 488 bus to said microprocessor and said microprocessor is automatically notified by said second interrupt signal that said IEEE 488 bus has completed the data transfer;
- wherein said microprocessor port includes a write line for receiving write pulses from said microprocessor; each said write pulses having a predefined duration and a trailing edge;

said interface further including:
- talker circuit means, coupled to said microprocessor port and said IEEE 488 bus, for asserting data received by said microprocessor port onto said IEEE 488 bus; said talker circuit means including a transparent latch for asserting and latching data received from said microprocessor port onto said IEEE 488 bus such that data received from said microprocessor port is asserted onto said IEEE 488 bus before the trailing edge of said write pulses; and
- source handshake means, coupled to said talker circuit means and said IEEE 488 bus, for asserting a signal on said DAV line of said IEEE 488 bus after said talker circuit has asserted data on said IEEE 488 bus for a first predefined minimum settling period;
- said source handshake means including speedup means that, when enabled, asserts said signal on said DAV line of said IEEE 488 bus after said talker circuit has asserted data on said IEEE 488 bus for a second predefined settling period that is less than said first predefined minimum settling period;
- whereby speed of transmission of data by said microprocessor is improved by reducing said settling period.

4. The interface set forth in claim 3, said interface including speedup enable switch for enabling said speedup means.

5. A bus interface which couples a microprocessor having a direct memory access controller to an IEEE 488 bus, the interface comprising:
- a microprocessor port which transmits and receives data to and from said microprocessor having a direct memory access controller which generates a terminal count (TC) signal upon transmission of any specified datum in a multiple datum data transfer; said microprocessor port including microprocessor data bus lines and a terminal count line for receiving said TC signals from said direct memory access controller;
- an IEEE 488 bus; said IEEE 488 bus including data lines and a NOT READY FOR DATA (NRFD) line;
- listener circuit means, coupled to said microprocessor port and said IEEE 488 bus, for transmitting data from said IEEE 488 bus to said microprocessor via said microprocessor port; and
- acceptor handshake means, coupled to said listener circuit means and said IEEE 488 bus, for asserting a holdoff signal on said NRFD line of said IEEE 488 bus when said microprocessor port receives a TC signal from said direct memory access controller until a predefined condition is met;
- whereby said acceptor handshake means automatically performs a data holdoff upon transmission of any specified datum in a multiple datum DMA data transfer from said IEEE 488 bus to said microprocessor.

6. The interface set forth in claim 5, wherein said microprocessor port includes a write line for receiving write pulses from said microprocessor; each said write pulses having a predefined duration and a trailing edge; said IEEE 488 bus including a data valid (DAV) line; said interface further including:
- talker circuit means, coupled to said microprocessor port and said IEEE 488 bus, for asserting data received by said microprocessor port onto said IEEE 488 bus; said talker circuit means including a transparent latch for asserting and latching data received from said microprocessor port onto said IEEE 488 bus such that data received from said microprocessor port is asserted onto said IEEE 488 bus before the trailing edge of said write pulses; and
- source handshake means, coupled to said talker circuit means and said IEEE 488 bus, for asserting a data valid signal on said DAV line of said IEEE 488 bus after said talker circuit has asserted data on said IEEE 488 bus for a first predefined minimum settling period;

said source handshake means including speedup means that, when enabled, asserts said signal on said DAV line of said IEEE 488 bus after said talker circuit has asserted data on said IEEE 488 bus for a second predefined settling period that is less than said first predefined minimum settling period;

whereby speed of transmission of data by said microprocessor is improved by reducing said settling period.

7. The interface set forth in claim 6,
said interface including an speedup enable switch for enabling said speedup means.

8. The interface set forth in claim 6,
said microprocessor having an interrupt signal port; said microprocessor port including at least one line for transmitting interrupt signals to said interrupt signal port of said microprocessor;

said acceptor handshake means including means for detecting when the last byte of a data transfer has been received from said IEEE 488 bus while said listener circuit means is transmitting data to said microprocessor via said microprocessor port and for then transmitting a first interrupt signal to said interrupt signal port of said microprocessor via said microprocessor port; and synchronization means, coupled to said IEEE 488 bus, for detecting when a data valid signal previously asserted on said DAV line is unasserted, including means for then transmitting a second interrupt signal to said interrupt signal port of said microprocessor via said microprocessor port; and a synchronization interrupt enable switch for enabling said synchronization means to send said second interrupt signal to said microprocessor; wherein said synchronization means does not send said second interrupt signal when a data valid signal previously asserted on said DAV line is unasserted unless said synchronization interrupt enable switch is enabled;

whereby said microprocessor is automatically notified by said first interrupt signal that the last byte of a data transfer has been transmitted by said interface from said IEEE 488 bus to said microprocessor and said microprocessor is automatically notified by said second interrupt signal that all other devices on said IEEE 488 bus have accepted the last byte of a data transfer.

9. The interface set forth in claim 5, wherein said microprocessor includes an interrupt signal port;
said microprocessor port including at least one line for transmitting interrupt signals to said interrupt signal port of said microprocessor;
said IEEE 488 bus including a data valid (DAV) line;
said acceptor handshake means including means for detecting when the last byte of a data transfer has been received from said IEEE 488 bus while said listener circuit means is transmitting data to said microprocessor via said microprocessor port and for then transmitting a first interrupt signal to said interrupt signal port of said microprocessor via said microprocessor port;
said interface further including:

synchronization means, coupled to said IEEE 488 bus, for detecting when a data valid signal previously asserted on said DAV line is unasserted, and for then transmitting a second interrupt signal to said interrupt signal port of said microprocessor via said microprocessor port; and a synchronization interrupt enable switch for enabling said synchronization means to send said second interrupt signal to said microprocessor; wherein said synchronization means does not send said second interrupt signal when a data valid signal previously asserted on said DAV line is unasserted unless said synchronization interrupt enable switch is enabled; said synchronization interrupt enable switch coupled to said microprocessor via said microprocessor port so that said microprocessor can enable and disable said synchronization interrupt enable switch;

whereby said microprocessor is automatically notified by said first interrupt signal that the last byte of a data transfer has been transmitted by said interface from said IEEE 488 bus to said microprocessor and said microprocessor is automatically notified by said second interrupt signal that said IEEE 488 bus has completed the data transfer.

10. The interface set forth in claim 9, said interface including:

talker circuit means, coupled to said microprocessor port and said IEEE 488 bus, for asserting data received by said microprocessor port onto said IEEE 488 bus;

source handshake means, coupled to said talker circuit means and said IEEE 488 bus, for asserting a data valid signal on said DAV line of said IEEE 488 bus after said talker circuit has asserted data on said IEEE 488 bus and for reasserting said data valid signal in accordance with a predefined source handshake protocol;

said synchronization means transmitting said second interrupt signal to said interrupt signal port of said microprocessor via said microprocessor port when said source handshaking means desserts said data valid signal on said DAV line and said synchronization interrupt enable switch is enabled.

11. The interface set forth in claim 10, wherein
said microprocessor port includes a write line for receiving write pulses from said microprocessor; each said write pulses having a predefined duration and a tailing edge; said talker circuit means including a transparent latch for asserting and latching data received from said microprocessor port onto said IEEE 488 bus such that data received from said microprocessor port is asserted onto said IEEE 488 bus before the trailing edge of said write pulses;

said talker circuit means including a transparent latch for asserting and latching data received from said microprocessor port onto said IEEE 488 bus such that data received from said microprocessor port is asserted onto said IEEE 488 bus before the trailing edge of said write pulses;

source handshake means, coupled to said talker circuit means and said IEEE 488 bus, for asserting a signal on said DAV line of said IEEE 488 bus after said talker circuit has asserted data on said IEEE 488 bus for a first predefined minimum settling period;

said source handshake means including speedup means that, when enabled, asserts said signal on said DAV line of said IEEE 488 bus after said talker circuit has asserted data on said IEEE 488 bus for a second predefined settling period that is less than said first predefined minimum settling period; and said interface including a speedup enable switch for enabling said speedup means;

whereby speed of transmission of data by said microprocessor is improved by reducing said settling period.

12. The interface set forth in claim 5, wherein said microprocessor includes an interrupt signal port;

said microprocessor port including at least one line for transmitting interrupt signals to said interrupt signal port of said microprocessor;

said IEEE 488 bus including a data valid (DAV) line; said interface further including:

talker circuit means, coupled to said microprocessor port and said IEEE 488 bus, for asserting data received by said microprocessor port onto said IEEE 488 bus;

synchronization means, coupled to said IEEE 488 bus, for detecting when a data valid signal previously asserted on said DAV line is unasserted, and for then transmitting a synchronization interrupt signal to said interrupt signal port of said microprocessor via said microprocessor port; and a synchronization interrupt enable switch for enabling said source handshake means to send said synchronization interrupt signal to said microprocessor; wherein said synchronization means does not send said synchronization interrupt signal when a data valid signal previously asserted on said DAV line is unasserted unless said synchronization interrupt enable switch is enabled;

whereby said microprocessor is automatically notified by said synchronization interrupt signal that said IEEE 488 bus has completed the data transfer.

* * * * *